(12) United States Patent
Chen et al.

(10) Patent No.: US 8,624,461 B2
(45) Date of Patent: Jan. 7, 2014

(54) MOTOR STATOR

(75) Inventors: Chien-Jung Chen, Kaohsiung (TW); Hsien-Wen Liu, Kaohsiung (TW); Chih-Tsung Hsu, Kaohsiung (TW); Tzu-Wen Tsai, Kaohsiung (TW); Cheng-Tien Shih, Pingtung County (TW); Hsin-Hsien Wu, Kaohsiung (TW); Jia-Ching Lee, Kaohsiung (TW)

(73) Assignee: Yen Sun Technology Corp., Kaohsiung (TW)

( * ) Notice: Subject to any disclaimer, the term of this patent is extended or adjusted under 35 U.S.C. 154(b) by 477 days.

(21) Appl. No.: 13/074,525

(22) Filed: Mar. 29, 2011

(65) Prior Publication Data

US 2012/0119607 A1    May 17, 2012

(30) Foreign Application Priority Data

Nov. 12, 2010   (TW) ................................ 99138992 A (51) Int. Cl.
*H02K 1/12* (2006.01)
*H02K 3/04* (2006.01)
*H02K 3/18* (2006.01)

(52) U.S. Cl.
USPC ......... 310/208; 310/71; 310/254.1; 310/68 R; 310/DIG. 6; 310/184; 417/423.7

(58) Field of Classification Search
USPC .............. 310/180, 184, 186, 190, 208, 254.1, 310/67 R; 417/423.7, 424.1
See application file for complete search history.

(56) References Cited

U.S. PATENT DOCUMENTS

| | | | | |
|---|---|---|---|---|
| 5,990,589 A * | 11/1999 | Ushikoshi | ........................ | 310/90 |
| 6,097,121 A * | 8/2000 | Oku | ................. | 310/91 |
| 6,394,768 B1 * | 5/2002 | Fukuda et al. | ........... | 417/423.15 |
| 6,531,796 B1 * | 3/2003 | Konno | ........................ | 310/67 R |
| 6,670,737 B2 * | 12/2003 | Chen | ...................... | 310/216.049 |
| 6,707,223 B1 * | 3/2004 | Huang | ........................ | 310/254.1 |
| 7,455,501 B2 * | 11/2008 | Horng et al. | .................. | 415/220 |
| 7,553,136 B2 * | 6/2009 | Ku et al. | ..................... | 417/423.7 |
| 7,619,337 B2 * | 11/2009 | Kasai et al. | ...................... | 310/89 |
| 7,622,834 B2 * | 11/2009 | Fujii et al. | .................... | 310/68 R |
| 7,755,240 B2 * | 7/2010 | Yang et al. | ........................ | 310/91 |
| 7,862,309 B2 * | 1/2011 | Chen et al. | .............. | 417/423.12 |
| 7,876,008 B2 * | 1/2011 | Yoshida et al. | ................. | 310/71 |

(Continued)

FOREIGN PATENT DOCUMENTS

TW              332058       * 10/2010   .............. F04D 25/06

OTHER PUBLICATIONS

English Machine Translation, Chen et al., TW 332058, Oct. 2010.*

*Primary Examiner* — Burton Mullins (74) *Attorney, Agent, or Firm* — Banner & Witcoff, Ltd.

(57) ABSTRACT

A motor stator includes an insulating frame having a plurality of projecting rods, an induction unit, and a plurality of conductive members. The induction unit includes an induction circuit board, a plurality of induction coils embedded within the induction circuit board, and a plurality of coil windings wound respectively on the projecting rods. The conductive members extend through the insulating frame and the induction circuit board for establishing an electrical connection between each of the induction coils and a corresponding one of the coil windings. The turn numbers of the coil windings are not limited by the area and thickness of the induction circuit board, and can be increased. Alternatively, the coil windings may be positioned to increase the magnetic pole slot number when energized. As such, a driving force of the motor stator can be increased.

6 Claims, 8 Drawing Sheets

(56) References Cited

U.S. PATENT DOCUMENTS

| | | | |
|---|---|---|---|
| 8,177,530 B2 * | 5/2012 | Horng et al. | 417/423.7 |
| 8,415,852 B2 * | 4/2013 | Chen et al. | 310/208 |
| 2009/0152973 A1 * | 6/2009 | Horng et al. | 310/179 |
| 2012/0119606 A1 * | 5/2012 | Chen et al. | 310/198 |

* cited by examiner

MOTOR STATOR

CROSS-REFERENCE TO RELATED APPLICATION

This application claims priority of Taiwanese Application No. 099138992, filed on Nov. 12, 2010.

BACKGROUND OF THE INVENTION

1. Field of the Invention

This invention relates to a driving device, and more particularly to a motor stator.

2. Description of the Related Art

Figure 1:
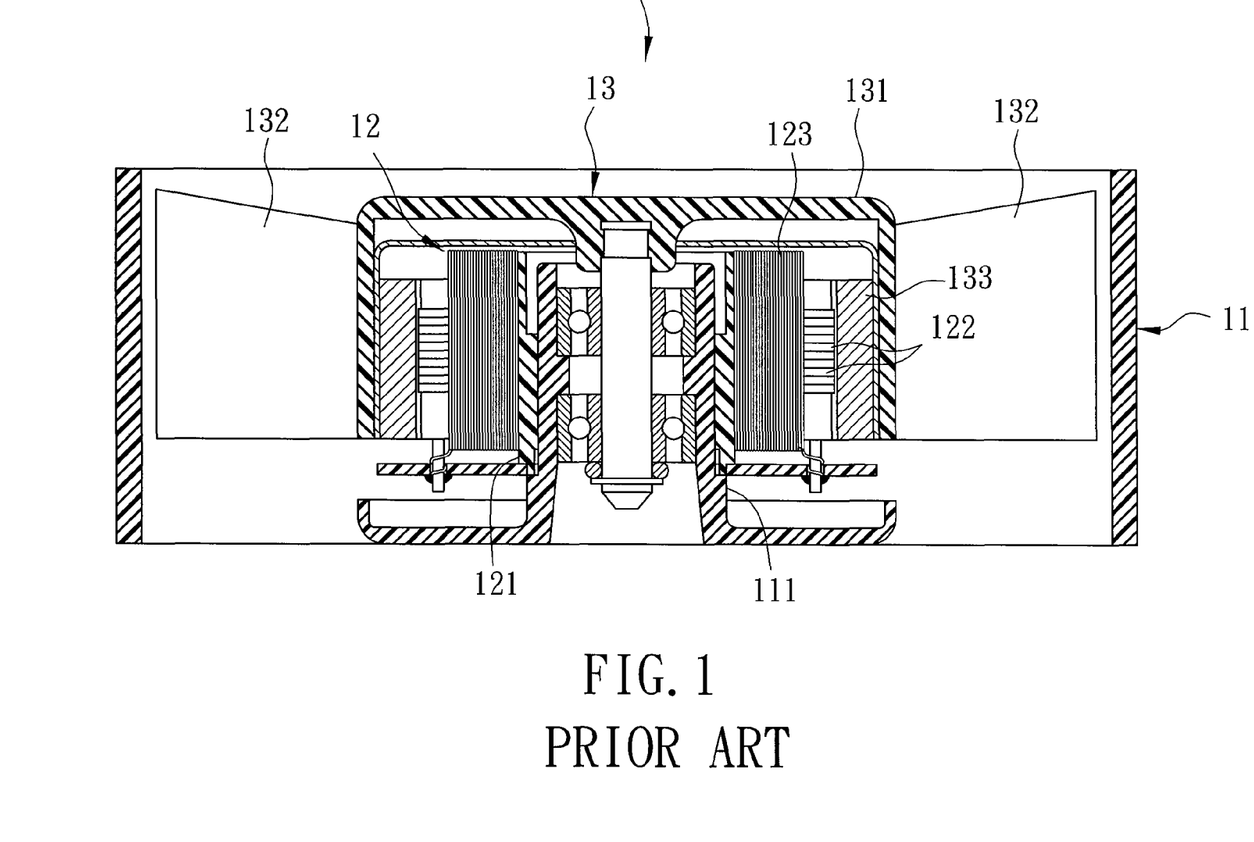
FIG. 1 is a sectional view of one conventional motor stator.

Referring to FIG. 1, a conventional heat-dissipating fan 1 includes an outer housing 11, a stator 12 disposed on the outer housing 11, and a rotor 13 disposed pivotally on the outer housing 11.

The outer housing 11 includes a tubular shaft 111. The stator 12 includes a stator frame 121 sleeved fixedly on the shaft 111, a plurality of superposed silicone steel sheets 122 fixed on the stator frame 121, and a plurality of induction coils 123 wound around the stator frame 121.

The rotor 13 includes a hub 131 disposed rotatably on the shaft 111 for covering the stator 12, a plurality of blades 132 extending outwardly from an outer peripheral surface of the hub 131, and a ring-shaped magnet 133 disposed fixedly on an inner peripheral surface of the hub 131 and spaced apart from and disposed around the stator 12.

When the induction coils 123 are energized, a repulsive magnetic force is created between the ring-shaped magnet 133 and the silicone steel sheets 122 to drive rotation of the ring-shaped magnet 133 and, thus, the rotor 13 relative to the stator 12.

Since both the silicone steel sheets 122 and the induction coils 123 are disposed on the stator frame 121, the stator 12 of the heat-dissipating fan 1 is relatively high (i.e., thick), thereby limiting the applicable range of the fan 1.

A thin motor stator has been proposed to solve the applicable range problem of the aforesaid conventional heat-dissipating fan 1. For example, referring to FIG. 2, in a thin fan disclosed in Taiwanese Patent Publication No. 332058, a bearing 21, a hub 22, an iron-contained metallic sheet 23, and a magnet 24 are integrated to constitute a rotating member 20. The rotating member 20 is driven by a coil circuit board 25 embedded with a plurality of coil windings 251. As such, the height of the fan is reduced to increase the applicable range of the fan.

Figure 2:
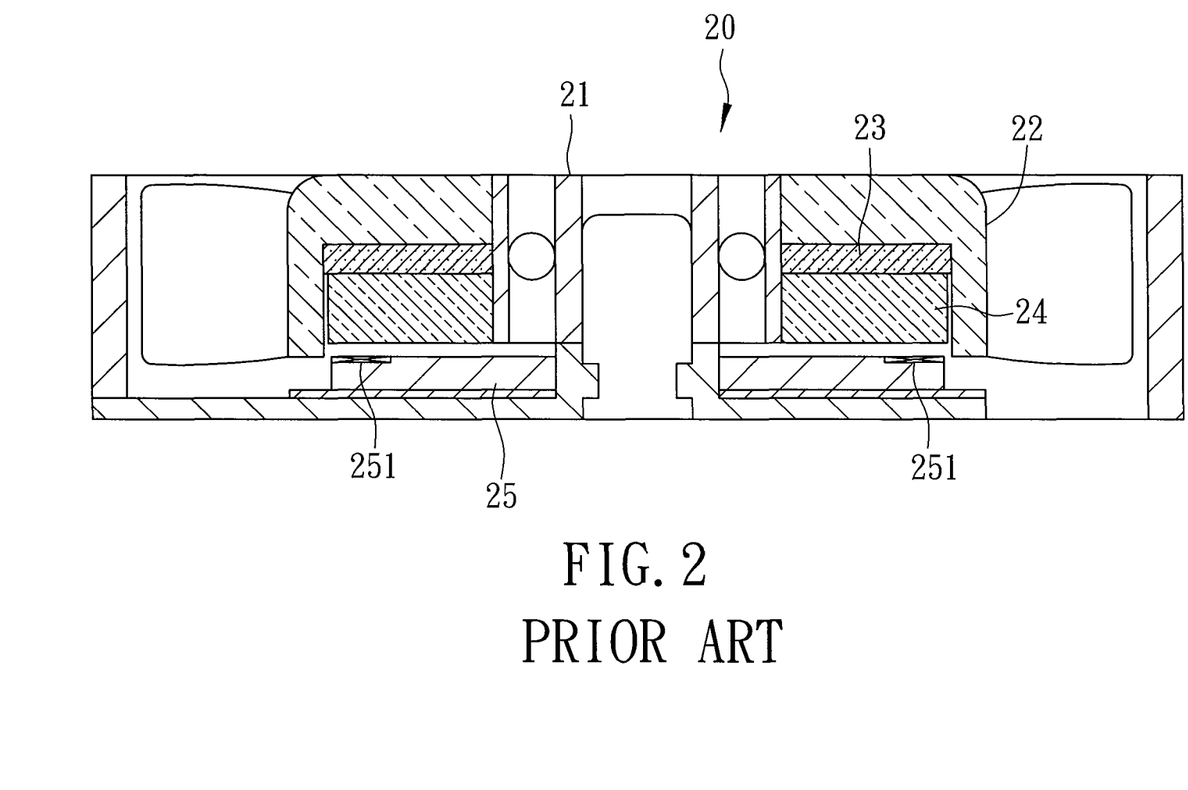
FIG. 2 is a sectional view of another conventional motor stator disclosed in Taiwanese Patent Publication No. 332058.

As well known in the art that, the more the turn numbers of the coil windings 251, the more the intensity of the magnetic field generated after the coil windings 251 are energized. However, since the area of the coil circuit board 25 is relative small, the turn numbers of the coil windings 251 are limited so that, when the coil windings 251 are energized, the intensity of the magnetic field thus generated is small. As a consequence, the rotational speed of the hub 22 is also small, thereby resulting in difficulties when driving rotation of the hub 22.

SUMMARY OF THE INVENTION

The object of this invention is to provide a thin motor stator that includes coils, the total turn number of which can be increased effectively.

Accordingly, a motor stator of this invention includes an insulating frame having a plurality of projecting rods, an induction unit, and a plurality of conductive members. The induction unit includes an induction circuit board, a plurality of induction coils embedded within the induction circuit board, and a plurality of coil windings wound respectively around the projecting rods. The conductive members extend through the insulating frame and the induction circuit board for establishing an electrical connection between each of the induction coils and a corresponding one of the coil windings.

As such, since the coil windings are wound respectively around the projecting rods, the turn number of each of the coil windings is not limited by the area and thickness of the induction circuit board, and can be increased. Alternatively, the coil windings may be positioned such that the magnetic pole slot number is increased when energized. Whether the turn number of each of the coil windings or the magnetic pole slot number is increased, a driving force of the motor stator is improved, and the performance of a motor incorporating the motor stator is promoted.

BRIEF DESCRIPTION OF THE DRAWINGS

These and other features and advantages of this invention will become apparent in the following detailed description of the preferred embodiments of this invention, with reference to the accompanying drawings, in which.

DETAILED DESCRIPTION OF THE PREFERRED EMBODIMENTS

Before the present invention is described in greater detail in connection with the preferred embodiments, it should be noted that similar elements and structures are designated by like reference numerals throughout the entire disclosure.

Figure 3:
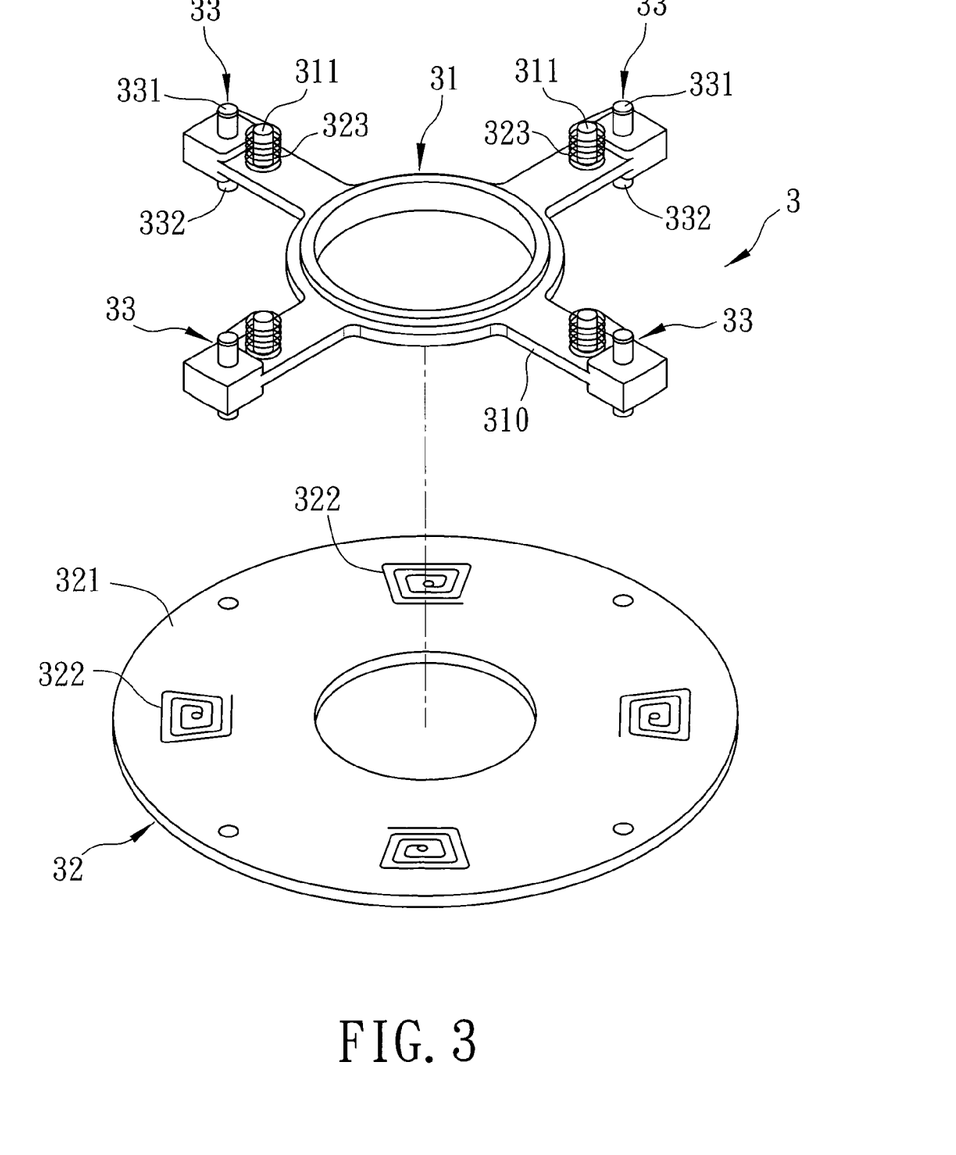
FIG. 3 is a partly exploded perspective view of the first preferred embodiment of a motor stator according to this invention.

Referring to FIG. 3, the first preferred embodiment of a motor stator 3 according to this invention includes an insulating frame 31 having a frame body 310 and a plurality of projecting rods 311 extending upwardly from the frame body 310, an induction unit 32 disposed on the insulating frame 31, and a plurality of conductive members 33 extending through the insulating frame 31 and the induction unit 32.

Figure 4:
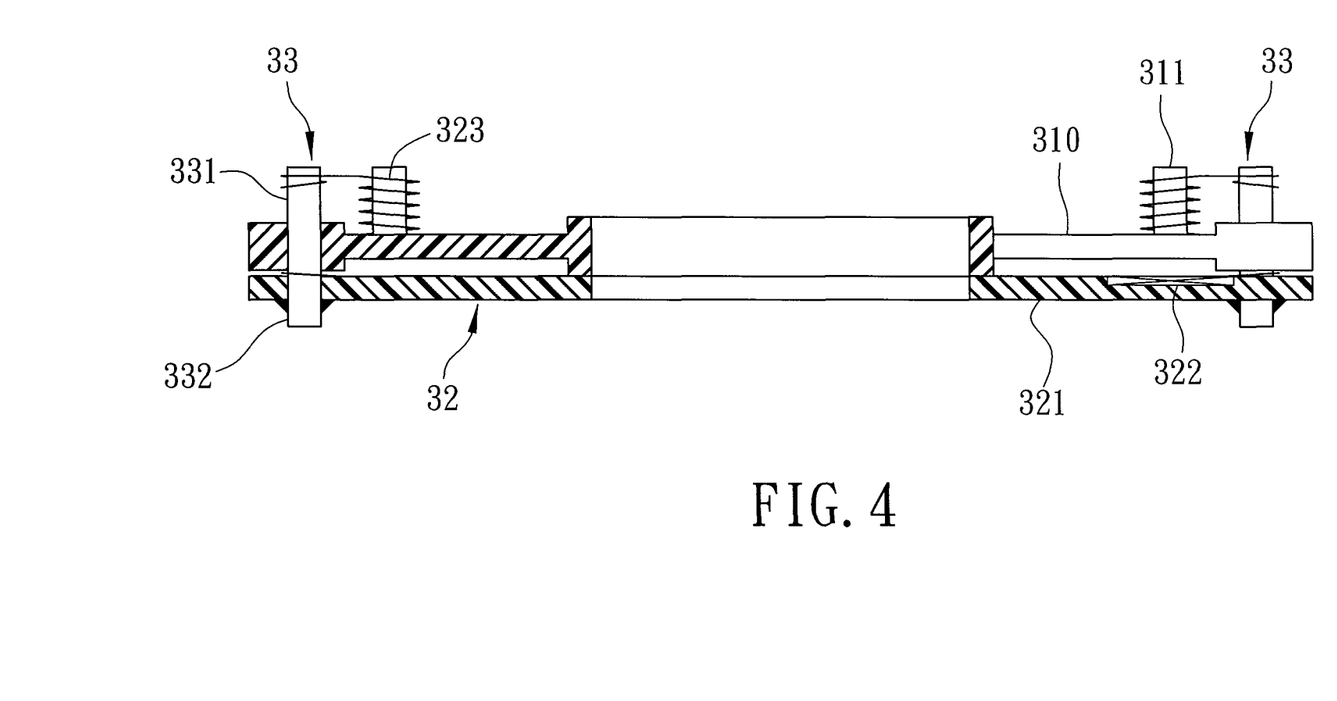
FIG. 4 is a sectional view of the first preferred embodiment.

With further reference to FIG. 4, the induction unit 32 includes an induction circuit board 321 disposed under the insulating frame 31, a plurality of spaced-apart induction coils 322 embedded within the induction circuit board 321, and a plurality of coil windings 323 wound respectively around the projecting rods 311 and arranged alternately with the induction coils 322.

In this embodiment, the insulating frame 31 has four projecting rods 311, and the induction unit 32 includes four coil windings 323, and four induction coils 322.

Each of the conductive members 33 has a first connecting rod section 331 extending upwardly from the insulating frame 31, and a second connecting rod section 332 extending downwardly from the insulating frame 31 and through the induction circuit board 321. The coil windings 323 are electrically connected to the first connecting rod sections 331 of the conductive members 33, respectively. The induction coils 322 are electrically connected to the second connecting rod sections 332 of the conductive members 33, respectively.

In this embodiment, the motor stator 3 includes four cylindrical conductive members 33. The insulating frame 31 is injection molded on the first connecting rod sections 331 of the conductive members 33.

Figure 5:
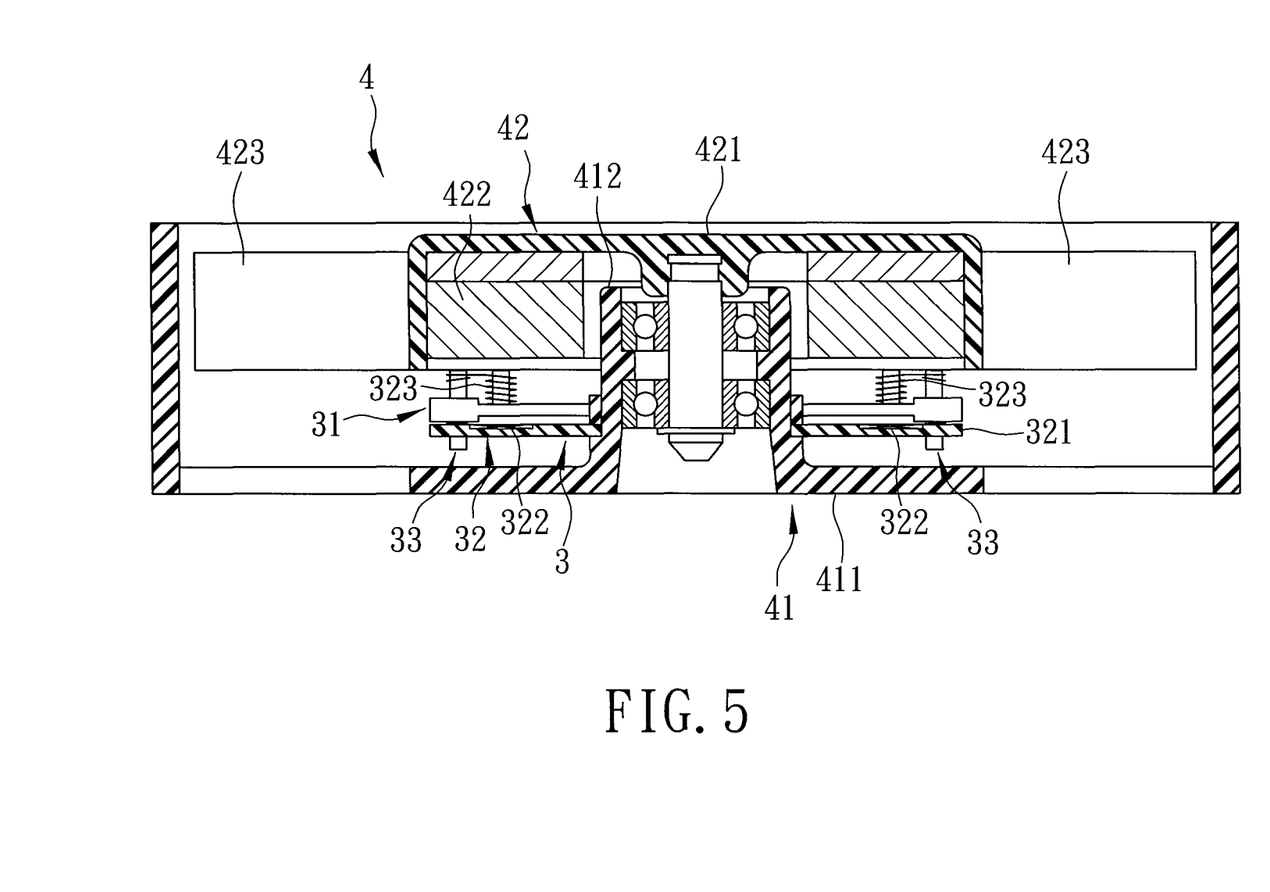
FIG. 5 is a sectional view of a heat-dissipating fan incorporating the first preferred embodiment.

With particular reference to FIGS. 3 and 5, the motor stator 3 is used on a heat-dissipating fan 4. The fan 4 includes a base 41 and a rotor unit 42.

The base 41 includes a main body 411 and a tubular shaft 412 extending upwardly from a central portion of the main body 411. The rotor unit 42 includes a hub 421 disposed rotatably on the shaft 412, a ring-shaped magnet 422 disposed fixedly and coaxially within the hub 421, and a plurality of blades 423 extending outwardly from an outer peripheral surface of the hub 421. The motor stator 3 is disposed fixedly on the shaft 412 and under the ring-shaped magnet 422.

When energized, electric current flows in the induction coils 322, the conductive member 33, and the coil windings 323, so as to generate a repulsive magnetic force for driving the ring-shaped magnet 422 and, thus, both the hub 421 and blades 423 to rotate.

Since the coil windings 323 are wound respectively around the projecting rods 311, the turn numbers of the coil windings 323 are not limited by the area and thickness of the induction circuit board 321, and can be increased according to the user's needs, so that the turn numbers of the coil windings 323 are greater than those of the induction coils 322. Hence, the intensity of the magnetic field generated from the coil windings 323 is greater than that generated from the induction coils 322, thereby resulting in an increase in the driving force of the magnetic stator 3 and the rotational speed of an assembly of the hub 421 and the blades 423.

Furthermore, since the coil windings 323 are arranged alternately with the induction coils 322, as describe above and shown in FIG. 3, the number of the magnetic pole slots formed as a result of energizing the motor stator 3 can be increased to further enhance the repulsive magnetic force for driving rotation of the hub 421 to thereby increase the rotational speeds of the hub 421 and the blades 423.

Figure 6:
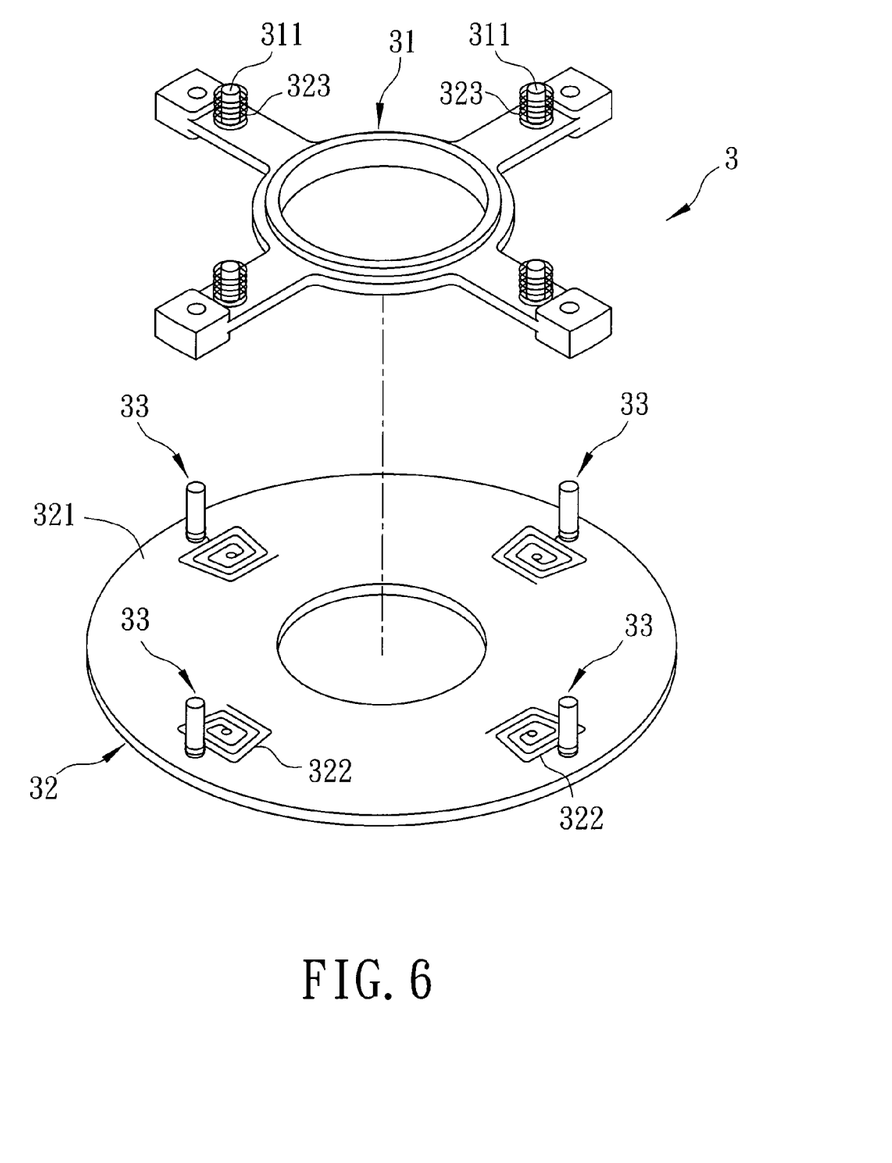
FIG. 6 is a partly exploded perspective view of the second preferred embodiment of a motor stator according to this invention.
Figure 7:
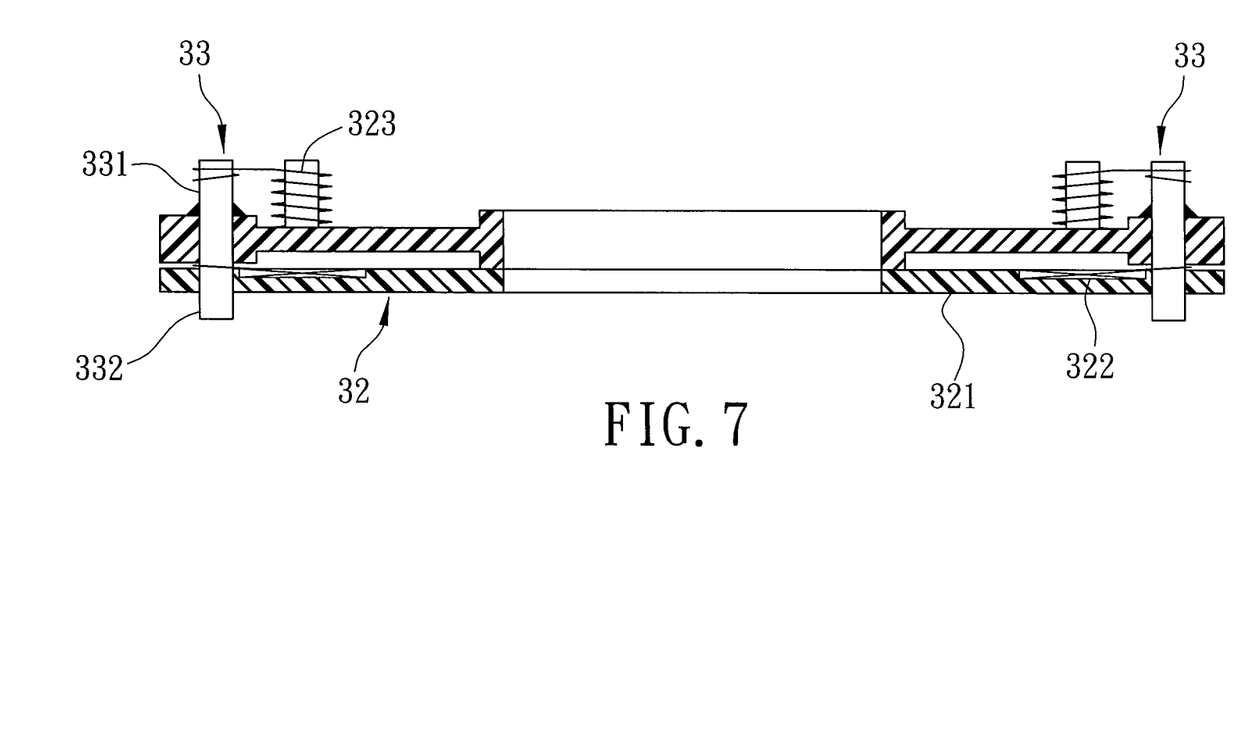
FIG. 7 is a sectional view of the second preferred embodiment.

FIGS. 6 and 7 show the second preferred embodiment of a motor stator 3 according to this invention, which is different from the first preferred embodiment in that the coil windings 323 are aligned respectively with the induction coils 322, and the induction circuit board 321 is injection molded on the second connecting rod sections 332 of the conductive members 33. Each of the coil windings 323 cooperates with the corresponding induction coil 322 to constitute a coil set.

Figure 8:
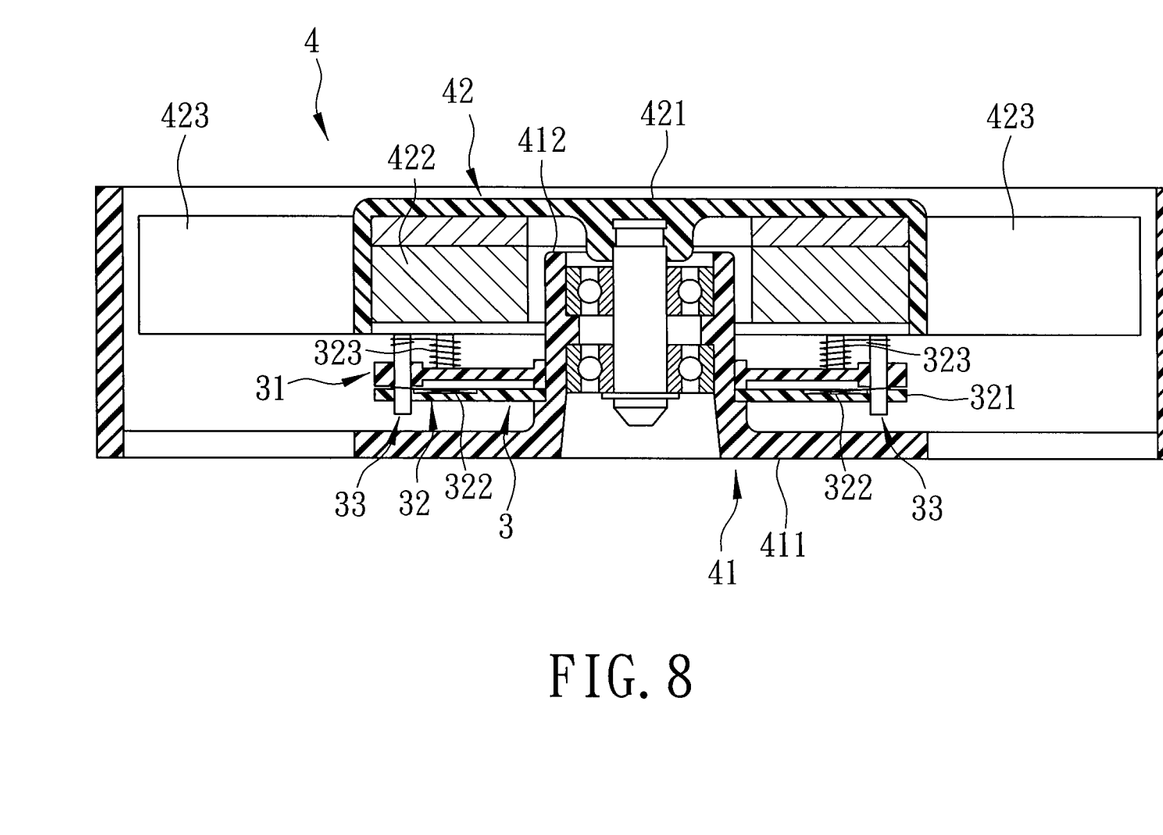
FIG. 8 is a sectional view of a heat-dissipating fan incorporating the second preferred embodiment.

With further reference to FIG. 8, when the motor stator 3 is applied to the heat-dissipating fan 4, the turn number of each of the coil sets is relatively large, the intensity of the magnetic field generated after the motor stator 3 is energized is enhanced to increase the repulsive magnetic force for driving rotation of the hub 421 and, thus, both the hub 421 and the blades 423.

In view of the above, since the coil windings 323 are wound respectively around the rods 311, the turn numbers of the coil windings 323 are not limited by the area and thickness of the induction circuit board 321, and can be increased, or the number of the magnetic pole slots formed as a result of energizing the motor stator 3 can be increased, so as to improve the repulsive magnetic force. Thus, the object of this invention is achieved.

With this invention thus explained, it is apparent that numerous modifications and variations can be made without departing from the scope and spirit of this invention. It is therefore intended that this invention be limited only as indicated by the appended claims.

We claim:

1. A motor stator comprising:
  an insulating frame having a frame body and a plurality of projecting rods extending from said frame body in the same direction;
  an induction unit including an induction circuit board positioned such that said frame body is disposed between said induction circuit board and said projecting rods, a plurality of induction coils embedded within said induction circuit board, and a plurality of coil windings wound respectively around said projecting rods;
  a plurality of conductive members extending through and connected to said insulating frame and said induction circuit board, so as to establish an electrical connection between each of said induction coils and a corresponding one of said coil windings.

2. The motor stator as claimed in claim 1, wherein the number of said coil windings is the same as that of said induction coils, and said coil windings are arranged alternately with said induction coils.

3. The motor stator as claimed in claim 1, wherein said coil windings are aligned respectively with said induction coils.

4. The motor stator as claimed in claim 1, wherein each of said conductive members has a first connecting rod section extending from said frame body of said insulating frame in a direction the same as that of said projecting rods, and a second connecting rod section opposite to said first connecting rod section and extending through and connected to said induction circuit board, said coil windings being respectively and electrically connected to said first connecting rod sections of said conductive members, said induction coils being respectively and electrically to said second connecting rod sections of said conductive members.

5. The motor stator as claimed in claim 4, wherein said insulating frame is injection molded on said first connecting rod sections of said conductive members.

6. The motor stator as claimed in claim 4, wherein said induction circuit board is injection molded on said second connecting rod sections of said conductive members.

* * * * *